Patented Apr. 7, 1936

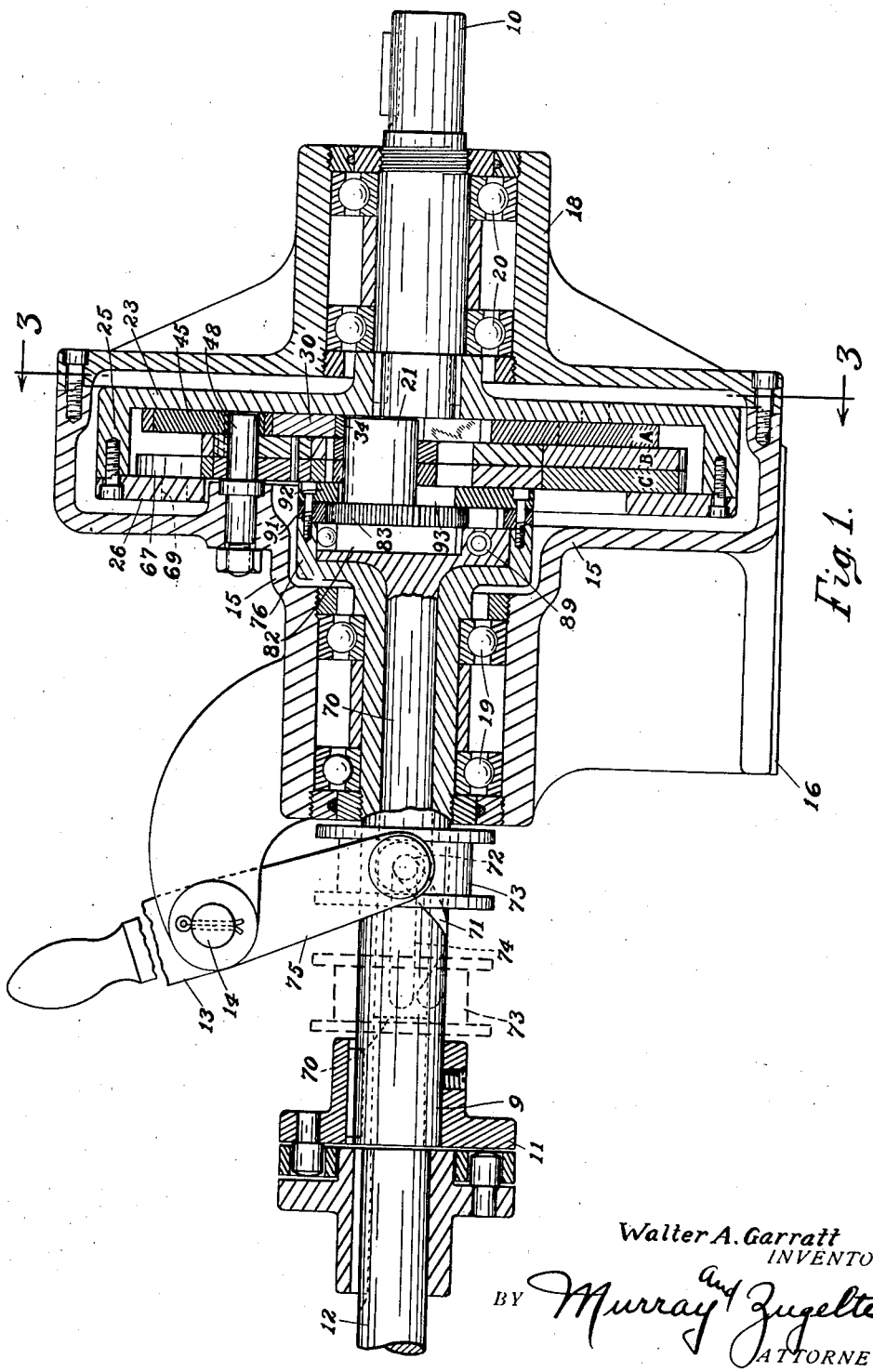

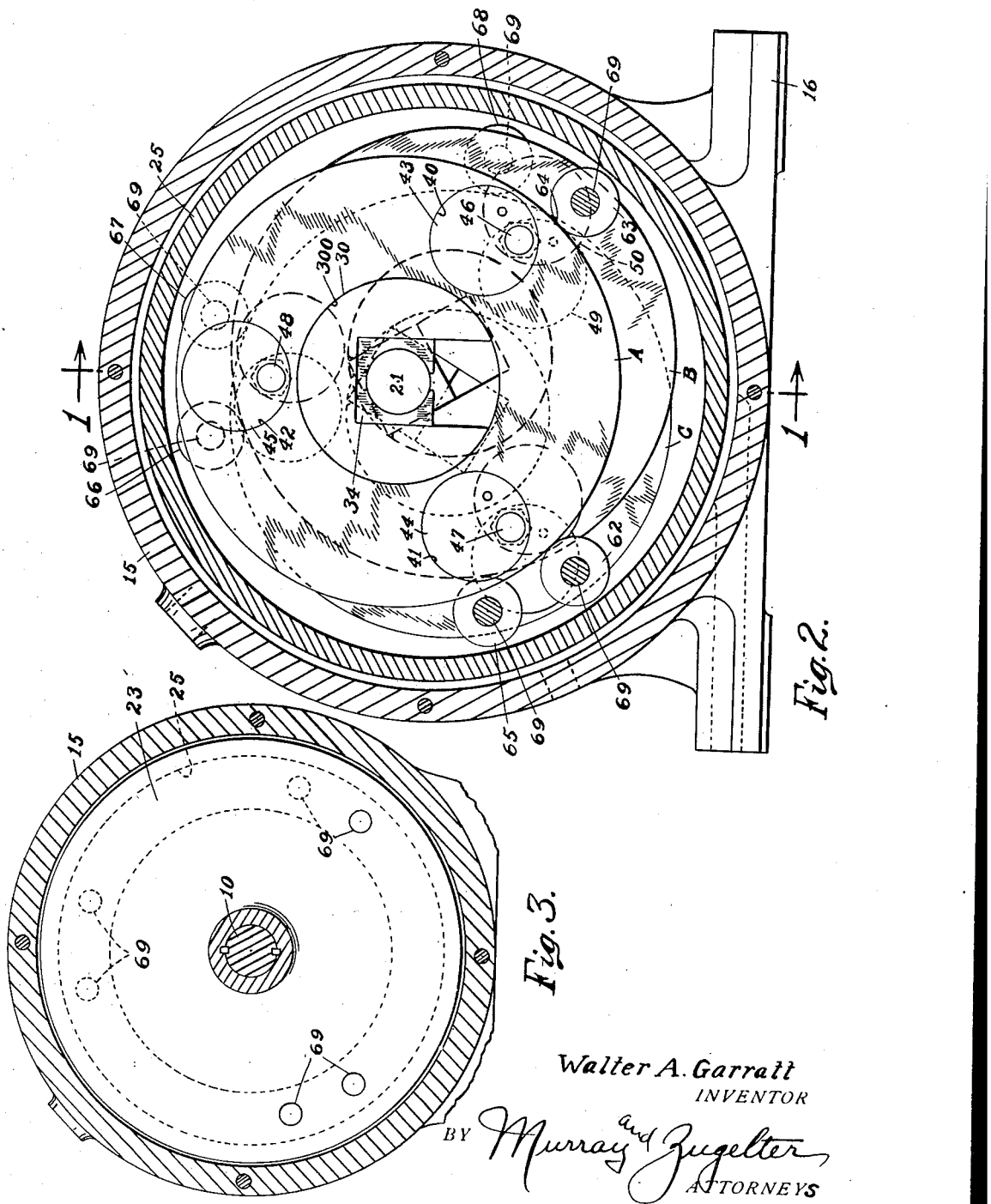

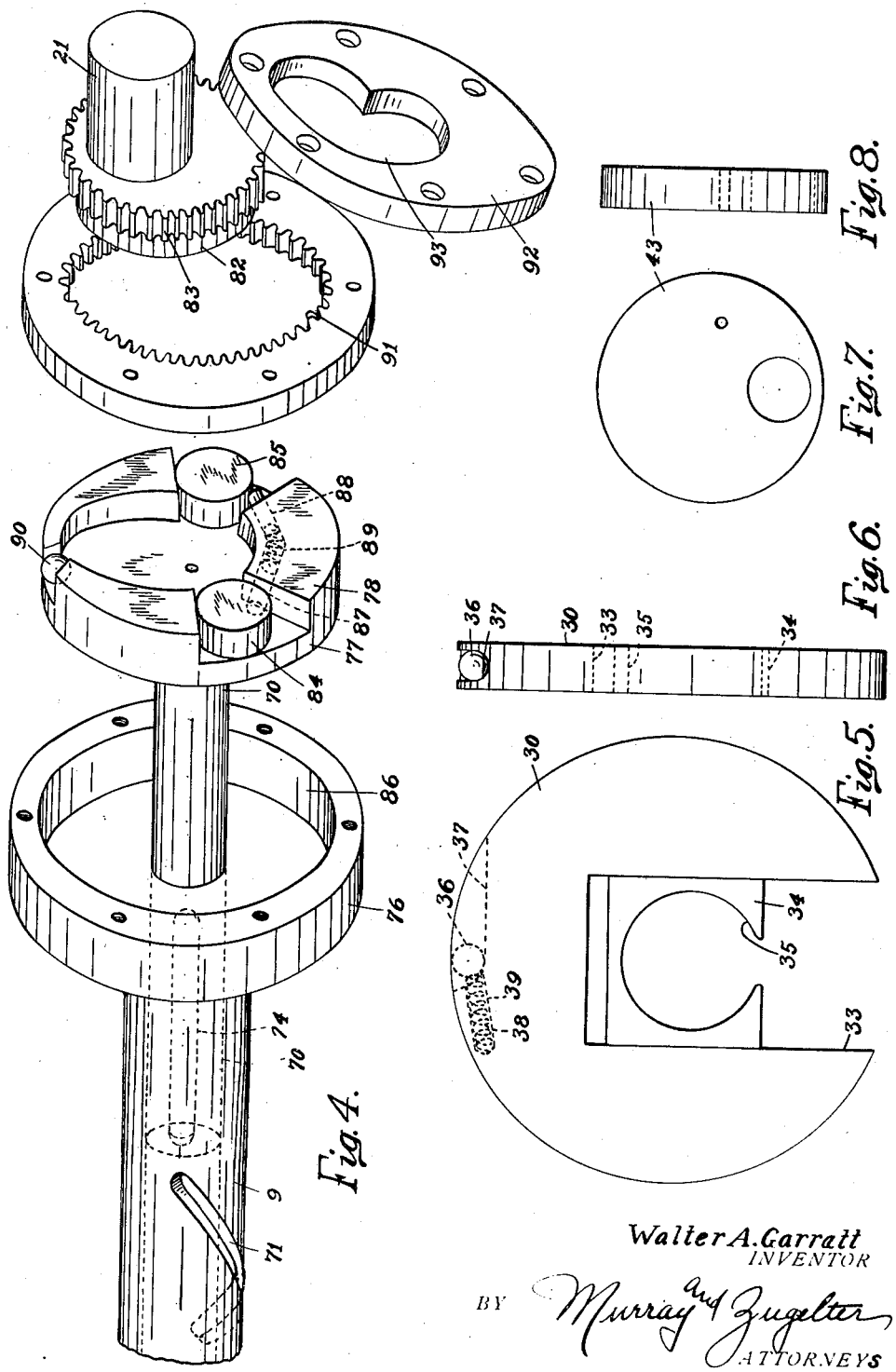

2,036,624

UNITED STATES PATENT OFFICE 2,036,624

VARIABLE SPEED POWER TRANSMISSION

Walter A. Garratt, Covington, Ky.

Application September 9, 1932, Serial No. 632,407

10 Claims. (Cl. 74—117)

This invention relates to a variable speed power transmission device whereby rotation of a drive shaft may be imparted to a driven shaft with an infinite number of speed ratios. The present invention may be considered a carrying forward or improvement upon the invention disclosed in my co-pending application Serial No. 27,602, filed May 2, 1925.

An object of the invention is to provide a device of the character stated, wherein there is eliminated selective shifting of gears in the transmission of power, and eliminating also the usual limitations of ratios inherent in selective gear shifting devices.

Another object is to provide a power transmission device of the character stated, wherein the drive and driven members are always in engagement, although there is at times no actual transmission of power from the drive to the driven parts thereof.

Another object of the invention is to provide a noiselessly and smoothly operating properly balanced transmission device having the characteristics stated above, wherein none of the constituent parts need be made delicate and complex in construction.

A further object is to provide a herein disclosed type of power transmission device having a minimum of parts, all of which are of simple and inexpensive design.

Other objects and further advantages will be more fully apparent from a description of the accompanying drawings, in which:

Figure 1 is a longitudinal vertical cross sectional view of the transmission of this invention.

Figure 2 is a sectional view taken on line 2—2, Fig. 1.

Figure 3 is a sectional view taken on line 3—3, Fig. 1.

Figure 4 is an exploded view drawn to a larger scale than Figure 1, and showing the adjustable crank pin mechanism embodied in this invention.

Figure 5 is a face view of one of the driver discs.

Figure 6 is a side view thereof.

Figure 7 is a face view of one of the suspension bodies.

Figure 8 is a side view thereof.

Although either end of this device may be driven by any suitable power means, it will be assumed for the purpose of conveying a full and clear understanding that 9 indicates the drive shaft and 10 indicates the driven shaft whose speed of rotation is to be varied. By means of any suitable type of coupling 11, the shaft 9 may be connected with the power shaft 12 of a motor, engine, or the like (not shown).

The drive shaft 9 is in the form of a sleeve and is journalled within ball bearings 19, 19, in a housing 15 which may have a base 16. Coaxial with and rotatably mounted within the sleeve 9 is a shaft 70. The control means consists of a control lever 13 pivoted on a pin 14 in a bracket attached to the case 10 or if preferred attached to a wall, or the floor, or any stationary object, together with a grooved collar 73 fitted for longitudinal adjustment on the sleeve 9, into which the forked end 75 of the control lever is fitted and a pin 72 extending inward from the surface of the groove in the collar (not through the forked end 75) through a spiral slot 71 in the sleeve 9 into a straight groove 74 in the shaft 70. This control provides means for changing the angular relationship of the sleeve 9 and the shaft 70 while the sleeve rotates.

A means is provided for changing the eccentricity of crank pin 21 to the drive shaft axis from zero to maximum according to the change of angular relationship between the drive shaft and the control shaft 70, and for maintaining the eccentricity of the crank pin 21 to the drive shaft axis for any selected position of the control lever 13 without strain on the control lever or its associated control parts. This means, comprises, the bell shaped casing 76 fixed to the end of the sleeve 9, the disc body 77 formed on the end of shaft 70 with its associated rollers 84, 85, and ball 90 associated with the plungers 87, 88, and spring 89, the internal gear 91 attached to the face of the casing 76, the hub 82, spur gear 83 and crank pin 21, which last three are fixed relative to each other and the cap plate 92 provided with a perforation 93.

The structure up to this point is more fully set forth and described in an application entitled "Transmission", Serial No. 692 filed January 7, 1935, which application has been filed on subject matter divided from this application.

In the present invention, the driven member is a shaft 10 journalled co-axially with the drive shaft 9 in the housing 15 within ball bearings 20, 20. The common axis of the drive and driven shaft is hereafter referred to as the main axis. To the driven shaft 10 is fixed a hollow drum shaped member 23 comprising a flanged plate and a ring plate 26 fastened to the flange 25 of the first mentioned plate. The crank pin 21 extends into the drum and surrounding it are three eccentric throw plates A, B and C. These plates are disposed symmetrically about the main axis.

The eccentric throw plate A has within its circumference and of substantially the same thickness, a driver disc 30, a driver shoe 34 therein, both of the last two contained in a central opening 300 of the throw plate. Three circular suspension bodies 43, 44 and 45 are rotatively fitted in respective holes 40, 41 and 42, in the eccentric throw plate A substantially equidistant from each other and substantially equidistant from the center of the eccentric throw plate.

Referring to Figures 5 and 6, driver disc 30 has a radial slot 33 in which the driver shoe 34 may slide radially. The driver shoe 34 has a circular opening 35 in which the crank pin 21 fits rotatively. The driver disc 30 is fitted rotatively in the central opening of the eccentric throw plate A and is restrained from rotating in but one direction relative to the eccentric throw plate by an overrunning clutch ball 36 which is located in a groove 37 and urged outwardly by a spring 38 in a bore 39. Each of the three suspension bodies 43, 44 and 45 (see Figure 2) has a hole which is eccentric to the center of the suspension bodies, which eccentricity is very slightly more than the maximum eccentricity of the crank pin 21 to the main axis.

Suspension studs 46, 47 and 48, parallel to the main axis, are fixed in the wall of the housing adjacent to the drive shaft 9 and are substantially equidistant from each other and from the main axis. The three suspension bodies 43, 44 and 45 are rotatively mounted on respective studs 46, 47 and 48 in the holes previously described. The eccentric throw plates A, B and C and their associated included parts are duplicates of each other. These three assemblies differ only as to position.

Each set of three adjacent suspension bodies, such as 43, 49 and 50, are disposed symmetrically about their common suspension stud 46 so that their radii of eccentricity form angles of 120° with each other and they are rotatably fixed together so that they rotate on the stud as a unit. Thus the eccentricities of the plates to the main axis are maintained equal and in fixed relative position. It is evident that the eccentric throw plates A, B and C cannot rotate on their centers but their centers may describe equal circles about the main axis. Such motion may be called pseudo-rotation and is so referred to hereafter.

If the relationship of the crank pin 21 to the eccentric throw plates is considered it will be seen that as the crank pin revolves about the main axis it presses the driver shoe 34 first against one side of the radial slot in the driver disc 30 and then against the other side. Now if the driver disc is free to rotate in the eccentric throw plate which contains it, it will do so first in one direction and then in the other and the driver shoe 34 will oscillate back and forth in the radial slot of the driver disc. As long as the throw of the crank pin is less than the throw of the eccentric throw plate the center of the driver shoe 34 will never reach or cross the center of the driver disc 30 and no motion will be communicated to the eccentric throw plate. But the driver disc is restrained by the clutch ball 36 so that it can rotate in the eccentric plate in only one direction. When the movement of the crank pin tends to rotate it in the other direction since it cannot so move the movement of the crank pin is transferred to the eccentric plate through the driving shoe and disc as a driving connection. It should be particularly noted that the movement of the crank pin when the driving connection is formed is a crank arm motion, only a fraction of the force of which results in a tendency to rotate the driver disc and thus it is seen that the clutching element never carries but a fraction of the load. The driving connection of the driver disc does not continue indefinitely but as soon as the pressure on the driving side of the radial slot exerted by the crank pin crosses over to the other side of the radial slot due to the revolution of the crank pin about the main axis then the driver disc is rotated in the direction in which it is not restrained by the clutch ball and it is no longer a driving connection. Then as the crank pin continues its revolution about the main axis its pressure on the radial slot crosses over again to the other side and the driving connection is again established.

Since the arrangement of the clutch determines the direction in which the eccentric throw plate moves, it is seen that this movement of the throw plate is not changed by changing the direction of revolution of the crank pin. This may be desirable.

Since the eccentric plates are all maintained in symmetrical phase relationship to the crank pin by the suspension bodies and studs above described one or another of the driver discs is always in a position of driving connection if there are three or more eccentric plates and the working load is passed from one to another in regular sequence, the load being carried at any one moment by that driver disc which is in the most advantageous position. The greater the number of plates provided the shorter the driving cycle of each driver disc will be, but since the movement of the one eccentric plate moves the others, they are all in continuous motion and the angular speed of the pseudo-rotation of the eccentric plates relative to the angular speed of revolution of the crank pin varies according to the throw of the crank pin.

It can now be understood that the continuous transfer of motion from the crank pin to the eccentric pseudo-rotating throw plates is dependent on the fact that eccentricity of the crank pin to the main axis is in one direction only and the eccentricity to the drive shaft axis of the eccentric pseudo-rotating plates is in such various directions as to have one or another of them always in position to receive the drive from the crank pin. This arrangement may be called symmetrical phase relationship. Such a relationship would not be changed if the eccentricities to the main axis of the pseudo-rotating plates extended all in one direction and the segments of the crank pin, enclosed each segment by one pseudo-rotating plate, were arranged symmetrically about the main axis. Such an arrangement of the segments of an eccentric is disclosed in the variable throw cranks of the automotive transmission, United States Letters Patent for which have been issued to me, namely, 1,986,572, issued January 1, 1935, and entitled "Variable speed power transmission device". In such an arrangement the pseudo-rotating plates could be made all in one piece and the adjacent suspension rollers would become cylinders eccentric to the suspension studs.

It remains to describe additional parts and to explain the method of transfer of motion from the eccentric pseudo-rotating throw plates to the driven member 10.

The drum shaped member 23 fixed to the driven member 10 has already been described. Referring to Figures 2 and 3, extending parallel to the main axis in the chamber of the drum shaped member are studs 69 carrying rollers 62, 63, 65, 66, 67, 68; rollers 62 and 63 in same plane as and in contact with plate A; rollers 65 and 66 in same plane as and in contact with plate B; rollers 67 and 68 in same plane as and in contact with plate C. Due to the overlap of the plates, these studs cannot pass through the chamber from wall to wall but each is fast in one wall only. The studs for rollers 62, 63 and 65 are in one wall and the studs for the rollers 66, 67 and 68 are in the other wall. These six studs are equidistant from the main axis and each pair in contact with one plate is disposed symmetrically, one of the pair on each side of and spaced apart from a line drawn through the main axis and the center of the plate with which the pair is associated. As the plates A, B and C go through their cycle of pseudo-rotation, the point of closest approach to the drum wall, such as the point adjacent to the suspension body 45 for plate A, rotates about the main axis at the same rate as the center of the plate. Since the rollers have a fixed distance from the main axis they act as obstructions to the pseudo-revolution of the plates and the drum shaped member 23 is rotated at the same rate as pseudo-rotation of the eccentric throw plates, so that the rate of rotation of the driven shaft 10 is the same as the pseudo rotative movement of the eccentric throw plates which varies according to the throw of the crank pin 21 which rotates at the rate of the drive shaft 9.

The operation of the machine involves three principal groups of parts. The first includes a drive member driving an eccentric system or device having a variable throw and means for varying the throw. This is the subject of the divisional application Serial No. 692, filed January 7, 1935, for "Transmission". The second includes means for transferring the rotation of the first eccentric system to a second eccentric system at a rotative speed varying according to the throw of the first eccentric system. The third includes means for transferring the rotation from the second eccentric system to the driven member.

It is the second group which involves the most important part of my invention. In considering it, both first and second eccentric systems or devices should be considered as a plurality of eccentric members though either one of the two systems may be made up of segments or sections of one piece. One system surrounds the other, one outer eccentric member for one inner eccentric member, the two in substantially the same plane. One system, either one, has only one direction of eccentricity and the other one has the direction of the eccentricity of its members symmetrically disposed about the main axis. Such a relationship we have called an arrangement of symmetrical phase relationship. Between each pair of associated eccentric elements one outer and one inner is interposed a member or group of elements which forms a driving connection between the two eccentric elements of a pair when the driving eccentric element presses against one part of it and does not form a driving connection but rotates within the outer eccentric element when the driving eccentric element presses upon that part of the interposed body which is opposite to the first mentioned part. The interposed member also adjusts itself with relation to any variation in the throw of the variable throw eccentric system.

Because of the fact that the direction of eccentricity of one eccentric system in relation to the eccentricities of the other eccentric system are arranged in symmetrical phase relationship so that some one or other of the interposed bodies are always in a position of driving connection and since each eccentric system is so related in its parts that movement of one element causes similar movement of all elements of the system thus maintaining proper phase relationship, continuous motion of output results from continuous motion of input and since variation in the throw of the variable throw eccentric system varies the relative speed of the two systems, output speed relative to the input speed varies according to change in the throw of the variable throw eccentric system.

Having described my invention, I claim:

1. In a device of the class described the combination of a drive member including a crank eccentrically supported thereby, a stationary housing for rotatably supporting the drive member, a plurality of stationary studs extending from the housing in parallelism with the drive member, an eccentrically disposed plate adapted to be moved bodily by the crank, shiftable means connecting the plate with the stationary studs said means including a plurality of eccentrics associated with both the plate and the studs, a driving connection between the crank and the plate, a track portion carried by the plate, a driven rotatable member, and means including an extension associated with the driven member and adapted to ride on the track portion of the plate, for imparting movement of the plate to the driven member.

2. In a device of the class described the combination of a drive member including a crank eccentrically supported thereby, a stationary housing for rotatably supporting the drive member, a plurality of stationary studs extending from the housing in parallelism with the drive member, an eccentrically disposed plate adapted to be moved bodily by the crank, shiftable means connecting the plate with the stationary studs said means including a plurality of eccentrics associated with both the plate and the studs, a driving connection between the crank and the plate, a track portion carried by the plate, a driven rotatable member, and means including at least two spaced apart extensions associated with the driven member and adapted to ride on the track portion of the plate, for imparting movement of the plate to the driven member.

3. In a device of the class described the combination of a drive member including a crank eccentrically supported thereby, a stationary housing for rotatably supporting the drive member, a plurality of stationary studs extending from the housing in parallelism with the drive member, an eccentrically disposed plate adapted to be moved bodily by the crank, shiftable means connecting the plate with the stationary studs said means including a plurality of eccentrics associated with both the plate and the studs, a driving connection between the crank and the plate, a track portion carried by the plate, a driven rotatable member, means including at least two spaced apart extensions associated with the driven member and adapted to ride on the track portion of the plate, for imparting movement of the plate to the driven member, and means for varying the eccentricity of the crank relative to the drive member.

4. In a device of the class described, a frame, a drive member journalled therein, a variable throw eccentric member associated with the drive member and adapted to be rotated thereby, means for varying the throw of the variable throw eccentric member, a plurality of fixed throw eccentric members surrounding the variable throw eccentric member and spaced apart therefrom, members interposed between the variable throw eccentric member and the fixed throw eccentric members for communicating motion from the variable throw eccentric member to the fixed throw eccentric members, cranks for suspending the fixed throw eccentric members in the frame, a driven member journalled in the frame, and members carried by the driven member engaged by the fixed throw eccentric members for communicating motion from the fixed throw eccentric members to the driven member.

5. In a device of the class described, a frame, a drive member journalled therein, a variable throw eccentric member associated with the drive member and adapted to be rotated thereby, a plurality of fixed throw eccentric members surrounding the variable throw eccentric member and spaced apart therefrom, said fixed throw eccentric members arranged in symmetrical phase relationship to the variable throw eccentric member, members interposed between the variable throw eccentric member and the fixed throw eccentric members for communicating motion from the variable throw eccentric member to the fixed throw eccentric members, cranks for suspending the fixed throw eccentric members in the frame, a driven member journalled in the frame, and members carried by the driven member engaged by the fixed throw eccentric members for communicating motion from the fixed throw eccentric members to the driven member.

6. In a device of the class described, a frame, a drive member journalled therein, a variable throw eccentric member associated with the drive member and adapted to be rotated thereby, means for varying the throw of the variable throw eccentric member, a plurality of fixed throw eccentric members surrounding the variable throw eccentric member and spaced apart therefrom, members interposed between the variable throw eccentric member and the fixed throw eccentric members for communicating motion from the variable throw eccentric member to the fixed throw eccentric members, there being one interposed member for each element of the plurality of fixed throw eccentric members and the corresponding surrounded portion of the variable throw eccentric member, the three being in the same plane, cranks for suspending the fixed throw eccentric members in the frame, a driven member journalled in the frame, and members carried by the driven member engaged by the fixed throw eccentric members for communicating motion from the fixed throw eccentric members to the driven member.

7. In a device of the class described, a frame, a drive member journalled therein, a variable throw eccentric member associated with the drive member and adapted to be rotated thereby, means for varying the throw of the variable throw eccentric member, a plurality of fixed throw eccentric members surrounding the variable throw eccentric member and spaced apart therefrom, members interposed between the variable throw eccentric member and the fixed throw eccentric members for communicating motion from the variable throw eccentric member to the fixed throw eccentric members, there being one interposed member for each element of the plurality of fixed throw eccentric members and the corresponding surrounded portion of the variable throw eccentric member, the three being in the same plane, cranks for suspending the fixed throw eccentric members in the frame and for maintaining a symmetrical phase relationship between the fixed throw eccentric members and the variable throw eccentric member throughout the operating cycle, a driven member journalled in the frame, and members carried by the driven member engaged by the fixed throw eccentric members for communicating motion from the fixed throw eccentric members to the driven member.

8. In a device of the class described, a frame, a drive member journalled therein, a variable throw eccentric member associated with the drive member and adapted to be rotated thereby, means for varying the throw of the variable throw eccentric member, a plurality of fixed throw eccentric members surrounding the variable throw eccentric member and spaced apart therefrom, members interposed between the variable throw eccentric member and the fixed throw eccentric members for communicating motion from the variable throw eccentric member to the fixed throw eccentric members, there being one interposed member for each element of the plurality of fixed throw eccentric members and the corresponding surrounded portion of the variable throw eccentric member, the three being in the same plane, each interposed member being a driving connection between the variable throw eccentric member and the corresponding surrounding fixed throw eccentric member when the variable throw eccentric member presses upon one part of the interposed member and rotating without driving connection when the variable throw eccentric member presses upon any other part of the interposed member not included in the part first mentioned, clutching elements included in each interposed member bearing against the fixed throw eccentric member coupling the interposed member to the fixed throw eccentric member for movement of the two in one direction only, the clutching elements receiving only a fraction of the force imparted to the interposed member for driving the fixed throw eccentric members by the variable throw eccentric, cranks for suspending the fixed throw eccentric members in the frame, and for maintaining a symmetrical phase relationship between the fixed throw eccentric members and the variable throw eccentric member throughout the operating cycle for constraining the motion of the fixed throw eccentric members to pseudo-rotation wherein the members do not rotate but their centers revolve about an axis, a driven member journalled in the frame, and members carried by the driven member engaged by the fixed throw eccentric members for communicating motion from the fixed throw eccentric members to the driven member.

9. In a device of the class described, a frame, a drive member journalled therein, a variable throw eccentric member associated with the drive member and adapted to be rotated thereby, means for varying the throw of the variable throw eccentric member, a plurality of fixed throw eccentric members surrounding the variable throw eccentric member and spaced apart therefrom, members interposed between the variable throw eccentric member and the fixed throw eccentric members for communicating motion from the variable throw eccentric member to the fixed throw eccentric members, each interposed member being a driving connection between the variable throw eccentric member and the fixed throw eccentric member when the variable throw eccentric member presses upon one part of the interposed member and rotating without driving connection when the variable throw eccentric member presses upon any other part of the interposed member not included in the part first mentioned, clutching parts included in each interposed member bearing against the fixed throw eccentric member coupling the interposed member to the fixed throw eccentric member for movement of the two in one direction only, cranks for suspending the fixed throw eccentric members in the frame for constraining the motion of the fixed throw eccentric members to pseudo-rotation wherein the members do not rotate but their centers revolve about an axis, a driven member journalled in the frame, and members carried by the driven member engaged by the fixed throw eccentric members for communicating motion from the fixed throw eccentric members to the driven member.

10. In a device of the class described a frame, a drive member journaled therein, a variable throw eccentric member associated with the drive member and adapted to be rotated thereby, means for varying the throw of the variable throw eccentric member, a plurality of fixed throw eccentric members surrounding the variable throw eccentric member and spaced apart therefrom and arranged in symmetrical phase relationship to the variable throw eccentric member, members interposed between the variable throw eccentric member and the fixed throw eccentric members for communicating motion from the variable throw eccentric member to the fixed throw eccentric members, there being one interposed member for each element of the plurality of fixed throw eccentric members and the corresponding surrounded portion of the variable throw eccentric member, the three being in the same plane, each interposed member being a driving connection between the variable throw eccentric member and the corresponding surrounding fixed throw eccentric member when the variable throw eccentric member presses upon one part of the interposed member and rotating without driving connection when the variable throw eccentric member presses upon any other part of the interposed member not included in the part first mentioned, clutching elements included in each interposed member bearing against the fixed throw eccentric member coupling the interposed member to the fixed throw eccentric member for movement of the two in one direction only, the clutch elements receiving only a fraction of the force imparted to the interposed member for driving the fixed throw eccentric members by the variable throw eccentric, cranks for suspending the fixed throw eccentric members in the frame and for maintaining a symmetrical phase relationship between the fixed throw eccentric members and the variable throw eccentric member throughout the operating cycle for constraining the motion of the fixed throw eccentric members to pseudo-rotation wherein the members do not rotate but their centers revolve about an axis, a driven member journaled in the frame, and members carried by the driven member engaged by the fixed throw eccentric members for communicating motion from the fixed throw eccentric members to the driven member.

WALTER A. GARRATT.